Jan. 5, 1954
F. L. FULKE
2,664,866
INTERNAL-COMBUSTION ENGINE
Filed Dec. 27, 1943
5 Sheets-Sheet 1
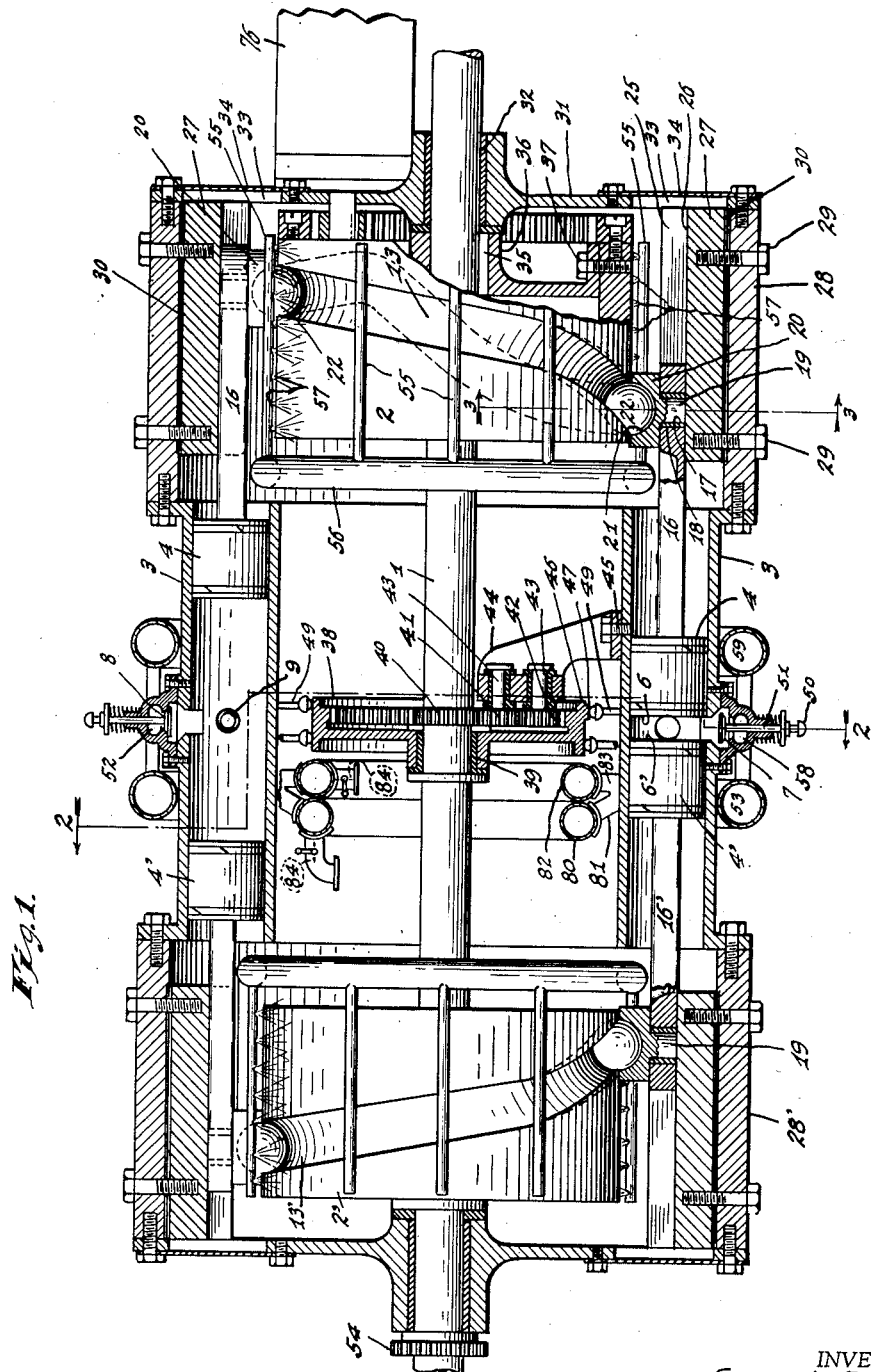
INVENTOR.
FRANK L. FULKE,
BY Hood & Hahn
ATTORNEYS.

Jan. 5, 1954  F. L. FULKE  2,664,866
INTERNAL-COMBUSTION ENGINE
Filed Dec. 27, 1943  5 Sheets-Sheet 2
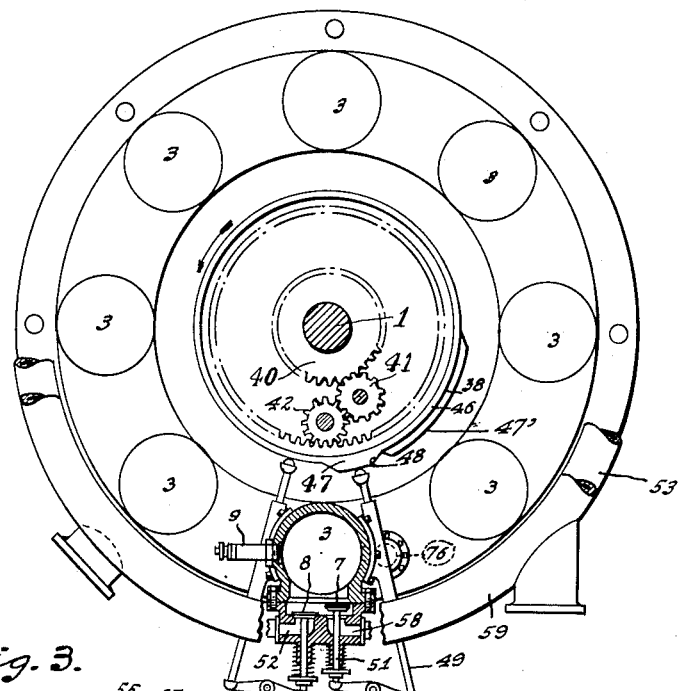
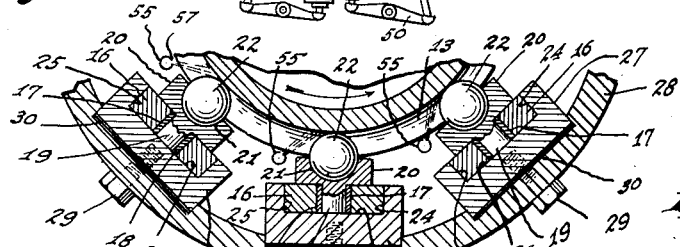
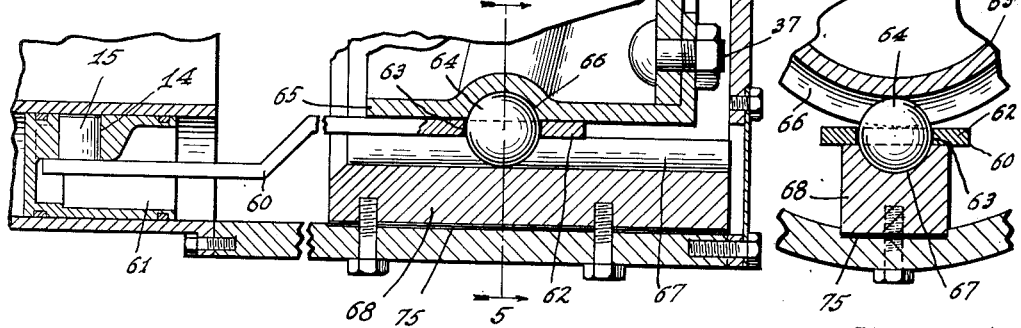
INVENTOR.
FRANK L. FULKE,
BY
Hood & Hahn
ATTORNEYS.

Jan. 5, 1954 — F. L. FULKE — 2,664,866
INTERNAL-COMBUSTION ENGINE
Filed Dec. 27, 1943 — 5 Sheets-Sheet 3

INVENTOR.
FRANK L. FULKE,
BY Hood & Hahn
ATTORNEYS.

Jan. 5, 1954
F. L. FULKE
2,664,866
INTERNAL-COMBUSTION ENGINE
Filed Dec. 27, 1943
5 Sheets-Sheet 4
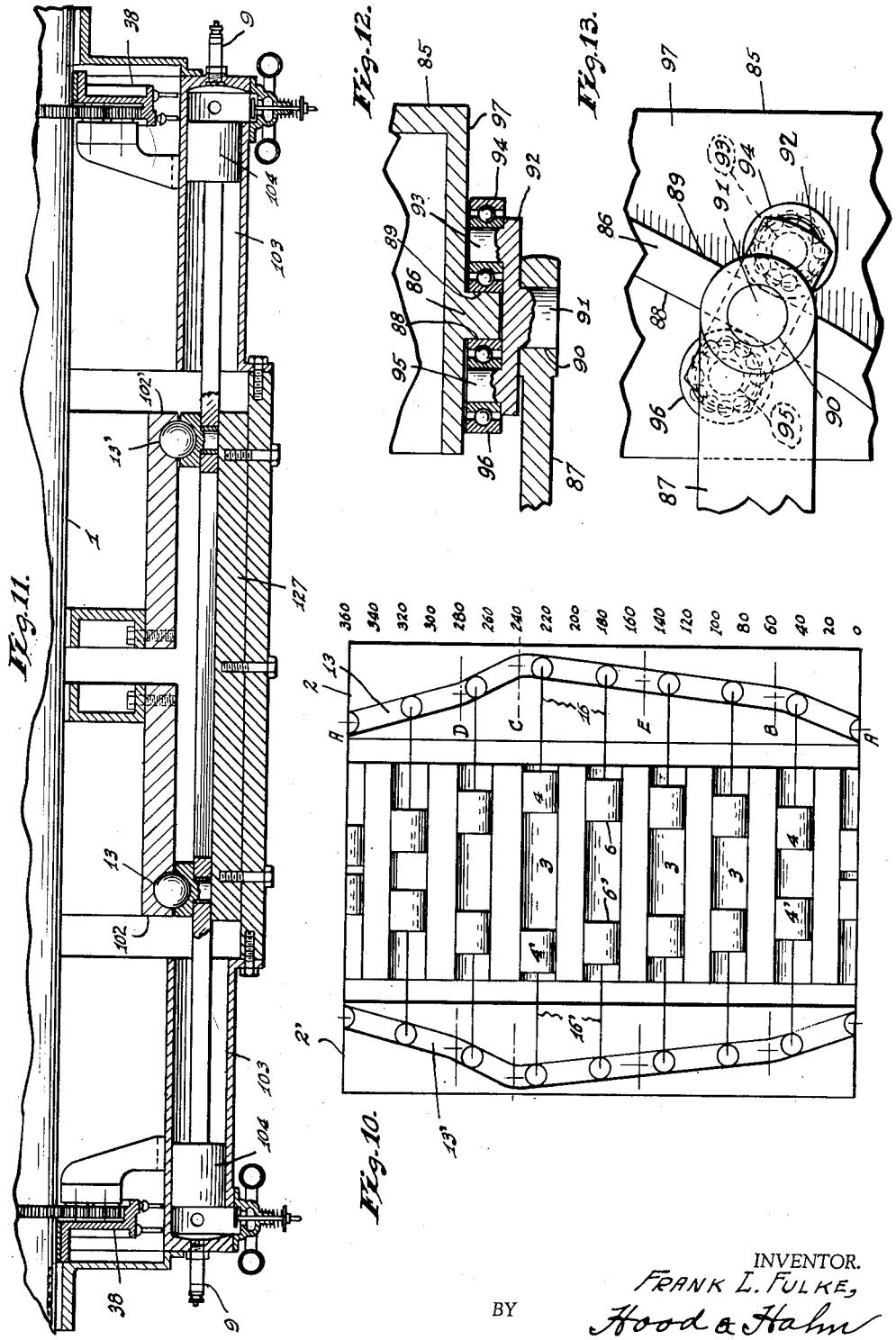
INVENTOR.
FRANK L. FULKE,
BY Hood & Hahn
ATTORNEYS.

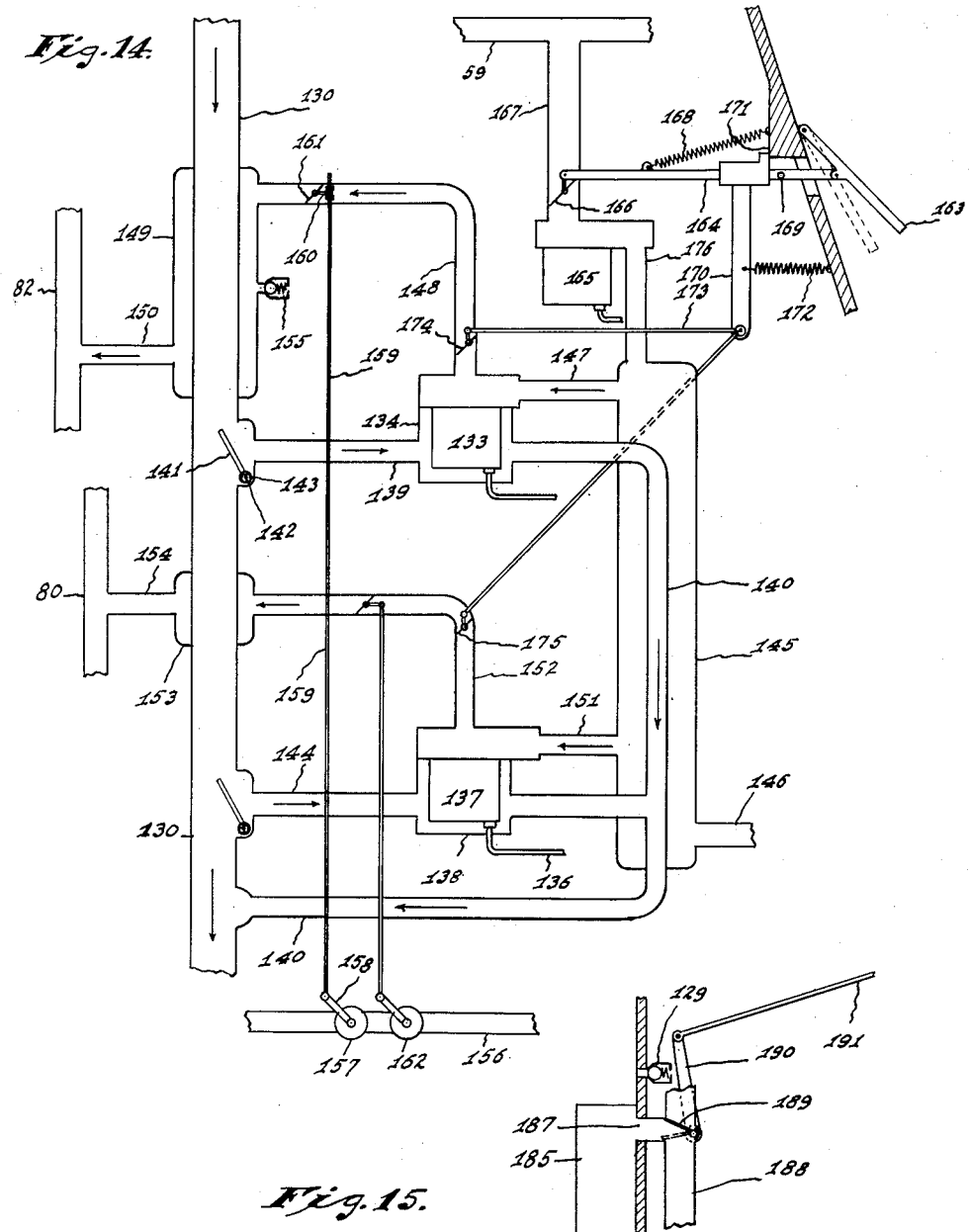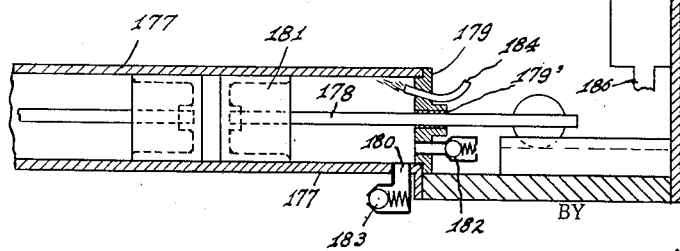

Patented Jan. 5, 1954

2,664,866

UNITED STATES PATENT OFFICE 2,664,866

INTERNAL-COMBUSTION ENGINE

Frank L. Fulke, Terre Haute, Ind.

Application December 27, 1943, Serial No. 515,749

7 Claims. (Cl. 123—58)

The present invention relates to internal combustion engines of the four stroke cycle type and to improved means for utilizing the energy of the explosions of fuel charges in the cylinders thereof and for converting the resultant reciprocatory movement of the engine pistons into rotation of a power delivery shaft. The primary objects of my invention are as follows.

To provide a more effective conversion of the power derived from an explosion in a cylinder of an internal combustion engine into power delivered by a powershaft.

Also, to provide an improved four stroke cycle engine in which the velocity of a piston may be changed during a stroke to increase or decrease such velocity with relation to a constant powershaft speed, whereby improvement in characteristics of the intake stroke or the power stroke or the exhaust stroke or the compression stroke, or all of them, may be obtained.

Also, to provide in a four stroke cycle engine for continuing the duration of the power stroke or the intake stroke or the exhaust stroke, or the compression stroke, or all of them, during a greater or lesser portion of one powershaft revolution than the 180 degrees characteristic of conventional crankshaft type engines, whereby improvement in the characteristics of the power stroke or the intage stroke or the exhaust stroke, or the compresison stroke, or all of them, may be obtained.

Also, to provide, in an internal combustion engine having a powershaft and pistons reciprocable on lines parallel with the axis of the powershaft, for an improved mechanism to connect the pistons to the powershaft.

Also, to provide a cam wheel rotative about the axis of the powershaft at half powershaft speed whereby faster opening and closing of valves may be accomplished relative to degrees of rotation of said powershaft.

Also, to provide, by means of a pair of pistons reciprocable in a common cylinder, in combination with other improvements to be described, for a more complete utilization of a unit of fuel for conversion into power delivered by a powershaft, it being common knowledge in the art that the proportion of the power actually effectively produced in an internal combustion engine by a unit of fuel is a very minor fraction of that unit's potential power, and it is my purpose to enlarge that fraction.

Also to provide means for supplying a cylinder, during one intake stroke, with a plurality of auxiliary vaporized substances superimposed upon gasoline vapor, with means dependent upon variation in engine operating characteristics to govern the admission of such auxiliary vaporized substances.

Also to provide a simple and novel method of supercharging oxygen into the cylinder.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a somewhat diagrammatic, fragmental section through an engine constructed in accordance with my invention;

Fig. 2 is a fragmental section taken substantially on the line 2—2 of Fig. 1 and looking in the direction of the arrows;

Fig. 3 is a fragmental section taken substantially on the line 3—3 of Fig. 1 and looking in the direction of the arrows;

Fig. 4 is a longitudinal section, upon a somewhat enlarged scale, of a modified form of piston and power-transmitting means;

Fig. 5 is a transverse section taken on the line 5—5 of Fig. 4 and looking in the direction of the arrows;

Fig. 10 is a diagram illustrating the cam grooves in plane development and showing the positions assumed by the pistons at various stages of rotation of the power shaft;

Fig. 11 is a somewhat diagrammatic fragmental longitudinal section through a modified form of engine;

Fig. 12 is a view similar to Fig. 4, but illustrating a modified propulsive mechanism in cooperation with a modified cam track;

Fig. 13 is a fragmental bottom plan view of the mechanism illustrated in Fig. 12;

Fig. 14 is a diagrammatic illustration of automatically and manually actuated control means for a supplemental charge-supplying means which may be used in my engine; and Fig. 15 is a fragmental, somewhat diagrammatic sectional view of means for supercharging my engine.

Figure 6:
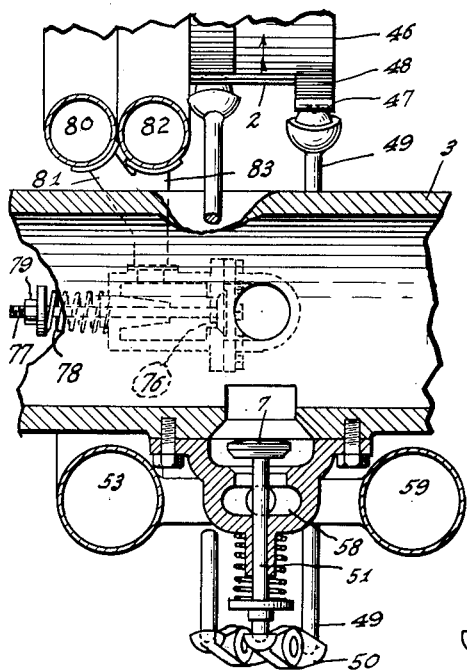
Fig. 6 is an enlarged longitudinal section through the fuel-supplying means.
Figure 7:
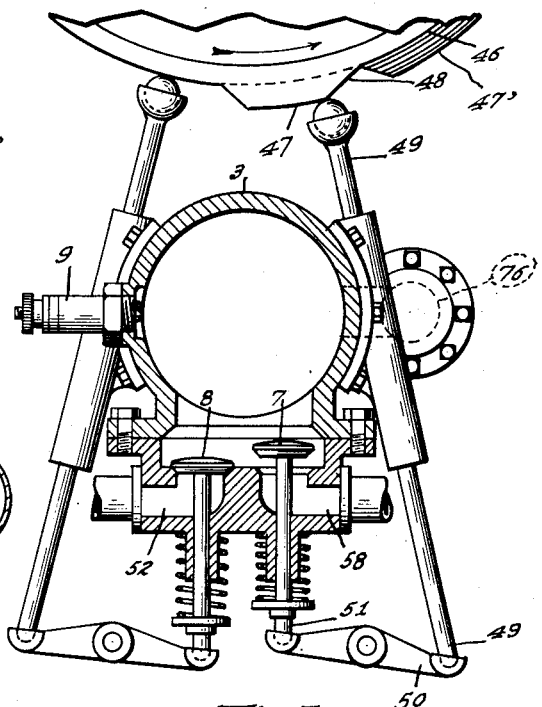
Fig. 7 is a transverse section through the detail shown in Fig. 6.
Figure 8:
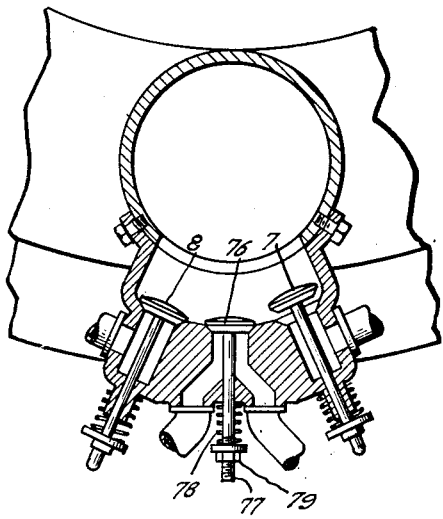
Fig. 8 is a section similar to Fig. 7 through a modified fuel-supplying arrangement.

In a conventional crankshaft type engine of the four stroke cycle type the movement of a piston is exactly the same for all four strokes. Its movement is fixed in duration to exactly one-half turn of the crankshaft, and its velocities during all four strokes are exactly fixed and predetermined by the turn of the crank from top dead center around half a circle to bottom dead center or vice versa.

Assuming satisfactory carburetion, valves and ignition, the efficiency of the utilization of a unit of fuel for producing power delivered by the pistons to the crankshaft of a conventional type engine depends upon these factors:

(a) The diameter of piston.
(b) Length of piston stroke.
(c) Ratio of compression.
(d) Timing of ignition.
(e) Quality of fuel.

There are, besides these, some other very important factors which, if they could be desirably incorporated, would have a very definitely beneficial influence, but many of which cannot be desirably incorporated in a conventional crankshaft engine. Any or all of them can be beneficially incorporated in the engine I have devised, as follows:

(1) A greater proportion than 180 degrees' rotation of the powershaft allotted to the power stroke.

(2) A greater proportion than 180 degrees' rotation of the powershaft allotted to the intake stroke.

(3) A lesser proportion than 180 degrees' rotation of the powershaft allotted to the exhaust stroke.

(4) A lesser proportion than 180 degrees' rotation of the powershaft allotted to the compression stroke.

(5) A faster piston travel during the first part of the power stroke and a reduced speed during the latter part (relative, of course, to a constant speed of powershaft rotation).

(6) A faster piston travel during the first part of the intake stroke and a reduced speed during the latter part.

(7) A faster piston travel during the first part of the exhaust stroke and a reduced speed during the latter part.

(8) A faster piston travel during the first part of the compression stroke and a reduced speed during the latter part.

(9) A greater distance of piston travel during the first part of the power stroke than during the latter part (relative, of course, to a constant speed of powershaft rotation).

(10) A greater distance of piston travel during the first part of the intake stroke than during the latter part.

(11) A greater distance of piston travel during the first part of the exhaust stroke than during the latter part.

(12) A greater distance of piston travel during the first part of the compression stroke than during the latter part.

Of course the 12 factors enumerated above are impossible of application to a conventional crankshaft type engine, nor have they ever been applied, to my knowledge, in any kind of internal combustion engine.

(13) The employment in an internal combustion engine having a single powershaft to which all pistons connect, of a single cylinder having a pair of pistons reciprocable toward each other during the compression and exhaust strokes, and away from each other during the power and intake strokes, considered from the viewpoint of complete neutralization of shocks and vibration attendant on the various piston strokes.

(14) Elimination of all lateral pressures upon the piston during any of its strokes.

(15) A more rugged and durable connection between the piston and the powershaft comprising a single large polished steel ball in line frictional engagement only with a flywheel surface, eliminating the conventional wrist pin bearing and the connecting rod bearing.

(16) The employment in an internal combustion engine having a single powershaft to which all pistons connect, of a single cylinder having a pair of pistons reciprocable toward each other during the compression and exhaust strokes, and away from each other during the power and intake strokes, considered from the viewpoint of the volume of fuel charge taken into the cylinder, its density (degree of vacuum) attained during the intake stroke; and, during the power stroke, the greater volume to which it may expand as related to its volume when received into the cylinder.

(17) A cam wheel rotative about the powershaft axis at half powershaft speed whereby opening and closing of all valves may be accomplished in decidedly less degrees of rotation of the powershaft, and similar valves of each successive cylinder in an annular ring of cylinders may be actuated by only one cam on the periphery of the cam wheel.

(18) Provision for supplying the cylinder with a plurality of auxiliary vaporized substances superimposed upon gasoline vapor, in order to secure a more effective power stroke, with provision to govern the admission of such auxiliary substances in relation to variable operating characteristics of the engine.

(19) Provision at little cost and with substantially no additional moving mechanism for supercharging the oxygen supply for the engine.

In my improved engine I have devised means to make favorable application of each and every one of the above described 19 factors, and it may be noted how peculiarly inter-related are the means I have found to apply them and how the application of one of the factors influences the application of others, in fact, how closely inter-related are the factors that one could hardly be employed beneficially in the absence of others.

In Fig. 1 powershaft 1 has spaced tandem flywheels 2, 2' preferably detachably bolted as at 37, to hubs 36, which are keyed as at 35, to the powershaft. In the space between these flywheels is interposed a plurality of cylinders 3 having their bores parallel with the axis of powershaft 1 and being radially grouped about the powershaft. In each cylinder is a pair of hollow pistons 4, 4' approaching the midpoint of the cylinder during the compression and the exhaust strokes and moving away from the midpoint during the power and intake strokes so that recoil forces present in conventional engines are absorbed and eliminated. All the right hand pistons 4 are connected to flywheel 2 and all the left hand pistons 4' are connected to flywheel 2' whereby all the pistons are connected to common powershaft 1.

Spark plug 9 located at the midpoint will ignite an explosive fuel mixture compressed between piston heads 6, 6'.

A suitable port is provided at one side of the middle portion of each cylinder 3 for the admission to or exhaustion of gases from cylinder 3 by means of intake valve 7 and exhaust valve 8. A further valve 16 is provided for a purpose which will be described.

A charge of compressed fuel vapor ignited by spark plug 9 will act upon piston heads 6, 6' to force them apart. It is to be especially noted that, although the two pistons deliver power by reciprocation in opposite directions upon a common line, they transform this energy into rotary movement of a single powershaft by applying their energy to flywheels 2, 2' at right angles to the line of piston travel, by means of grooves 13, 13' and their angularity.

The thought of charging an explosive mixture between two oppositely-movable piston heads constitutes an important feature of my invention; but that concept is of no practical commercial value until coupled with my concept of means whereby the oppositely-directed simultaneous power strokes of those pistons can be caused to act upon a common rotor. Thus, the provision of tandem flywheels on a common powershaft, as disclosed herein, is likewise an important feature of my invention; and the combination of the oppositely-acting pistons in a common cylinder with the said tandem flywheel arrangement is a further inventive feature. Although I have long appreciated the potential value and advantages of the oppositely-acting piston arrangement, I also recognized the impracticability of such an arrangement if the individual pistons were arranged to coact with separate powershafts; and thus it was not until I conceived the tandem flywheel structure that I was able to perceive a feasible application of the obviously desirable arrangement of oppositely-acting pistons reciprocable in a common cylinder under the influence of an explosive charge between them.

On the faces of flywheels 2, 2' which are of substantial width are formed grooves 13, 13' and these grooves are of substantially semicircular cross section. These grooves 13, 13' wind laterally of the faces of flywheels 2, 2' from right to left and left to right as viewed in Fig. 1. Each of these grooves winds about the peripheral face of its flywheel upon a path which travels from a point adjacent one axial edge of that face to a point adjacent the opposite axial edge of that face, and then back to the starting point, in the fashion most clearly disclosed in Fig. 10 and in Fig. 1. The contour of each of these cam grooves 13 and 13', and the functional reasons for that particular contour, will be discussed hereinafter.

In Fig. 1 the elements to the right-hand side of the midpoint of cylinder 3 and the elements to the left thereof work in unison and do the same things, so that in giving a detailed description of the right-hand side of my improved engine it may not be necessary at all times to mention the left-hand side and say that those elements are doing the same thing.

Piston 4 is bored at its side as at 14 (see Fig. 4) and into bore 14 may be placed a stud 15 formed on a side of connecting rod 16 to associate it with the piston. Rod 16 is bored at 17 (Fig. 1) and provided with a suitable bearing 18 for stud 19 of a cup shaped element 20 having a substantially semispherical cup 21 holding a large hollow hardened and polished ball 22. The engagement of ball 22 with cup 21 is an engagement in which full floating ball 22 is perfectly free to turn or move in any direction about its own center. Cup 21 may also rotate on stud 19 journalled in rod 16.

Approximately half of ball 22 is engaged by cup 21 and approximately the other half of ball 22 projects into groove 13 of flywheel 2, this groove being of semi-circular outline to permit a full line contact with the surface of ball 22, and being hardened, ground and polished.

Referring to Figs. 1 and 3, it will be seen that an annular end housing 28 supports internally an annular series of guide elements 27 corresponding in number to the cylinder-piston assemblies of the engine, said guide elements being secured to said housing by screws 29 or the like. Each of said guide elements is formed to provide a trough paraxial with the shaft 1, and having a floor 26 and upstanding lateral walls 24 and 25 with which the bottom and lateral surfaces of the associated piston rod 16 have a snug fit. It will be clear that that portion of the end of rod 16 which carries the element 20 and ball 22 is rigidly guided in the guide element to move in a path parallel with the axis of shaft 1. Thus piston 4 will reciprocate on a straight line without any angular pressures being placed on the piston. This is certainly a desirable improvement over conventional engines in which pistons are under severe lateral pressures.

In a conventional engine the power stroke is of course 180 degrees of crankshaft rotation, as are the intake, exhaust and compression strokes, and the lateral angle of pressure on the pistons varies quickly from zero to perhaps 45 degrees, then back to zero in ½ turn of the crankshaft.

It has always seemed to me that the great weakness of the so-called barrel type engines has been the element connecting the pistons to the powershaft. I know of none other than the ones I have contrived which, from the standpoint of strength and durability, could be considered anything but a great sacrifice, in comparison with ordinary connecting rod bearings of a conventional crankshaft type of engine. It must be considered that the connection between piston and powershaft must necessarily be at a considerable distance from the powershaft axis so that the peripheral speed of the powershaft element to which the pistons are connected is simply tremendous at the point of such connections. If the flywheels 2, 2' are of 14" diameter, the peripheral speed at 4,000 R. P. M. would be about 240 feet per second. It is not conceivable to me that any form of propulsive connection between piston 4 and flywheel 2 could be satisfactorily contrived to meet these conditions, except an outright full floating contact. In recognition of this I have deliberately contrived my organization to employ an outright floating connection to the best possible advantage by employing semi-cylindrical groove 13 in the peripheral face of flywheel 2; with a large hollow steel ball 22 in full line contact therewith and in full floating contact with cup 21 carried swivelly by piston rod 16; and by appropriate guiding elements, I have devised means to counter the severe thrusts thereby expectable.

Owing to the sharp bends of groove 13, the line contact provided by my ball 22 is the only kind of contact that could rapidly follow these bends and maintain full contact without either binding in the groove or having too loose a relation with the groove. Therefore the spherical shape of ball 22 and the semi-cylindrical shape of groove 13 are definitely functional.

This is not a small weak finger-in-groove connection. It must also be remembered that when the intake stroke occurs, also if a cylinder does not fire, the piston 4 must be pulled quickly through its outbound stroke. Whatever connection with the powershaft is employed must withstand terrific jerks as as well as extreme speeds at the point of contact, and with these facts in mind the weakness of the connections employed in barrel type engines with which I am familiar becomes readily apparent.

It is, of course, to be understood that all friction points in my engine are to be constantly bathed, preferably by forceful jets of oil at all times while the engine is operating. Also that the line of contact of ball 22 is constantly shifting, so that no focusing of wear may occur upon the ball. It may also be considered that the curvature of ball 22 approaches zero at its midpoint, relative to the lateral thrust involved against its cup 21 by reason of pressure engagement against the lateral walls of groove 13. So I make the engagement of cup 21 and of groove 13 extend as nearly to the midpoint of ball 22 as possible so as to reduce this thrust to minimum. Ball 22 is formed hollow either by casting or by welding two stamped halves together, and rod 16 is preferably channeled, so that the weight of these rapidly reciprocating parts may be reduced to minimum.

Shims 30 may be interposed between guide elements 27 and their seats in the housing 28 for obtaining a close fit of the related parts.

A disc shaped end housing 31 supports my powershaft 1 by means of suitable bearings 32, and has open spaces as at 33 closed by cover plates 34.

If cover plate 34 is removed, guide element 27 may, after removing screws 29, be withdrawn endwise from annular housing 28. Stud 15 of rod 16 may then be withdrawn from bore 14 in the piston 4 and when this happens ball 22 will disengage from groove 13 of flywheel 2 so that the piston 4, rod 16, cup 20 and ball 22 may be readily withdrawn from the engine for repair or replacement.

The reaction of the balls 22 upon the groove 13 will be such as to tend to wipe the groove surface free of oil. Therefore, as is clearly illustrated in Figs. 1 and 3, I provide a series of lubricant pipes 55, all connected to a header 56 leading from a source of lubricant under pressure, and each formed with a plurality of delivery ports 57. Each of such pipes 55 is so positioned that it lays a curtain of oil upon the entire axial extent of the peripheral surface of the flywheel immediately in advance of each of the balls 22; i. e., upon an axially-extending portion of that surface which is just about to move into contact with such ball. Thus, a quantity of oil is deposited in the groove substantially coincident with the line of engagement therewith of each ball 22, thus to be interposed between the ball and the groove surface to minimize wear therebetween.

Figs. 4 and 5 illustrate a modification of the connecting rod and guide illustrated in Fig. 1. The connecting rod 60 is at one end detachably connected to piston 61 as previously described and at its other end is flattened at 62 and perforated with an eye 63 sized closely to accommodate the diameter of ball 64. Flywheel flange 65 is provided with a cam groove 66 of reduced semi-circular cross section and it will be noted that this flange has been substantially reduced in weight. Preferably the flange 65 may be cast with groove 66 almost to size, so that minimum machining and grinding will be necessary to finish it.

Ball 64 takes into flywheel groove 66 and at its opposite side takes into a longitudinal groove 67 of reduced semi-circular cross section formed in guide block 68. At its middle, ball 64 fits into eye 63 of connecting rod 60 so that it will move with rod 60 at all times. Obviously ball 64 now not only has the function of propelling the flywheel but, by its engagement in groove 67 of guide block 68 it also has the functions of guiding the reciprocation of the piston 61 upon a straight line and of resisting thrusts angularly related to the line of reciprocation of the piston 61 and occasioned by its propelling engagement with flywheel groove 66. It may be noted that all engagements of the ball 64 with all other elements are line engagements, namely, in flywheel groove 66, guide block groove 67 and connecting rod eye 63, whereby friction is reduced, there being no appreciable surface frictional area whatever. Ball 64 is of course full floating in that it is perfectly free to constantly shift its spherical surface whereby the three line contacts upon its surface are constantly shifting and no focusing of wear upon ball 64 can occur. It is also to be understood that pressure jets of oil are constantly playing upon all engaging surfaces during the operation of the engine. In the foregoing modification it should also be evident, as in Fig. 1, that by endwise removal of guide block 68 the piston, the connecting rod, and the ball, may be readily removed from the engine for inspection or repair, and shims 75 conveniently may adjust the proper fit of associated parts.

Figs. 12 and 13 illustrate a simple modification of the cam groove 13 of Fig. 1 in which the cam groove becomes a track 86 of rectangular cross section projecting outward from the peripheral face 97 of flywheel 85. This track 86 has side walls 88, 89 and is disposed around the peripheral face 97 of flywheel 85 exactly in the same manner as the groove 13 of Fig. 1 and it functions in the same way.

Piston rod 87 carries a swivel element 92 preferably by means of a bore 90 in rod 87 into which a stud 91 formed centrally of swivel element 92 is fitted to journal. Spaced equi-distant from stud 91 the swivel element 92 has a further pair of studs 93, 95 which carry rollers 94, 96 which may be conventional ball bearing assemblies in which the outer races of such assemblies act as rollers to engage side walls 88, 89 of track 86.

It has previously been explained how in Fig. 1 the ball 22 may at all times maintain a full line contact with the semi-cylindrical groove 13 regardless of the sharp lateral deflection of groove 13, so that there may be no binding, nor may there be any looseness at any time between the propelling ball 22 and the flywheel 2 which is being propelled.

Assuming the thickness of track 86 to be exactly one inch between sidewalls 88, 89 at all points, then I propose to so dispose the centers of studs 93, 95 that the rollers 94, 96 will be 1.001 inches apart and will therefore have proper operative contact with the sidewalls 88, 89 of track 86 at all times.

But track 86 deflects sharply laterally, and the only way I can provide for this is to provide that the line connecting the axes of studs 93, 95 may freely shift so as to always be at right angles to track 86. This function is of course performed by stud 91 swivelling freely in bore 90 of the piston rod 87.

It will therefore be seen that contact of the propelling element carried by piston rod 87 with the cam track 86 is a full floating contact that will oscillate laterally of the line of reciprocation of the piston as track 86 deflects laterally of the face 97 of flywheel 85. Obviously rollers 94, 96 will spin continuously, without change of direction of rotation, at all times the engine is in operation. Obviously also the jets of oil provided by lubricant pipes 55 will at all times provide adequate lubricant to the rapidly spinning rollers. Likewise it should be apparent that the piston rod 87 may, like piston rod 16 of Fig. 1 be provided with guiding surfaces for cooperation with stationary guiding surfaces to guide its reciprocation upon a straight line and resist lateral thrusts resulting from propulsion of the flywheel 85.

In order to better understand the explanation of the operation of my engine, it seems advisable to assign some dimensions to its various parts as follows.

These dimensions are applied only to the specific example under consideration and of course by appropriate modification of the dimensions power units of greater or lesser size may be constructed.

In one suitable embodiment of my invention, the diameter of ball 22 is 2 inches, the diameter of the flywheels 2 and 2' is 14 inches, the diameter of pistons 4 and 4' is 3 inches. The piston stroke is 5 inches.

The volume of a vaporous fuel charge drawn into a cylinder 3 inches in diameter by a 5 inch stroke of a single piston would be approximately 35 cubic inches. Let M represent the mass of 35 cubic inches of such a charge at substantially atmospheric pressure. Then mass M of fuel charge would be drawn into a conventional type of cylinder with a fixed dome by a 5-inch stroke of a piston 3 inches in diameter. Then the 5-inch strokes of my two pistons would, if not otherwise controlled, draw mass 2M of fuel charge into my cylinder. But, for reasons to be explained, I want to draw into my cylinder only the same mass M of fuel charge as would a conventional engine, so I will have to close my intake valve 7 when only 2½ inches of my 5-inch stroke of each of my pistons 4 and 4' has occurred. Then the remaining 2½ inches of intake stroke of each of those pistons will "stretch" or rarefy the charge of fuel of mass M which, at substantially atmospheric pressure occupies a volume of approximately 35 cubic inches, to a volume of approximately 70 cubic inches. That is what would happen if nothing else of a special nature occurred. Preferably, however, I will, suitably following the closing of intake valve 7, and under suitable conditions, as for example when the engine is hot, permit a valve 76 (in a fashion later to be described) to admit to the cylinder an auxiliary charge of vaporous material which I may desire to add to the standard explosive mixture.

If, on the power stroke, my valves are closed during substantially the entire strokes of the pistons 4 and 4', it will be seen that I will be able to utilize the expansion of the products of combustion, within the cylinder, to a volume of approximately 70 cubic inches; i. e., twice the volume occupied by mass M of the original fuel charge at atmospheric pressure. The mass (and volume at atmospheric pressure) of vaporous material admitted auxiliarly through the valve 76 may be varied to suit conditions, but, because of the means which controls its admission, will always be insufficient to increase the pressure within the cylinder, at the limit of the intake strokes of the pistons 4 and 4', to atmospheric value. This possibility of utilizing the expansive forces of the products of combustion to an effective volume materially exceeding the volume occupied, at atmospheric pressure, by the unexploded charge is a radical departure from conventional engines in which the volume to which the exploded charge may expand is only that volume which the original charge occupies when it is received into the cylinder.

In Fig. 1, wheel 38 journals upon powershaft 1 by a suitable bearing 39. Gear 40, which is fastened to powershaft 1, drives a spur gear 41 and gear 41 drives gear 42, both of which are journaled as at 43 in a bracket 44 which is rigidly bolted to inner surfaces of the engine as at 45. Gear 42 is in mesh with teeth formed internally of flange 46 of wheel 38, and the foregoing gears are so proportioned that wheel 38 will make one revolution about the axis of powershaft 1 to every two revolution of powershaft 1.

Powershaft 1 rotates counter-clockwise when viewed from the right hand end of the engine as in Fig. 2. Therefore wheel 38 will also revolve counter-clockwise as shown in Fig. 2.

Flange 46 carries upon its peripheral face a single cam 47 at its right hand side as seen in Fig. 1 and carries another similar cam 47' at its left-hand side. The cam 47 controls all the intake valves 7. Cam 47 has at 48 (Fig. 2) the sloping walls necessary with any valve cam for the gradual lifting of push rod 49 to open valve 7, it being realized that this sloping wall 48 must of necessity occupy a certain number of degrees of one revolution of powershaft 1. In a conventional engine having the usual camshaft with conventional cams formed at small distance from the axis of the camshaft it is readily understood that the cam surface necessary for complete lifting of the push rod occupies a very considerable number of degrees of one rotation to get the valve compeltely open. This is not at all desirable. It may now be clearly understood that since flange 46 is disposed at a long distance radially of my powershaft axis, the number of degrees of powershaft rotation occupied by my cam lifting surface 48 is exceedingly small when compared with conventional valve cams.

Push rod 49 actuates a rocker arm 50 to press upon the valve stem 51 to open the valve 7. It is to be understood that only conventional applications of push rods, rocker arms, etc., are involved so all these parts need not be shown and described in detail. It is, however, to be understood that my cam surface 48 opens the intake valve of each cylinder in turn, as it revolves, so that when wheel 38 has made a complete revolution every cylinder will have in turn had its intake valve opened. The peripheral distance on flange 46 that the cam 47 extends will, of course, govern the time each valve remains open, and it will then close very quickly, as described regarding the rapidity of its being fully opened.

The other cam surface on flange 46 actuates all the exhaust valves in turn, just as described for the intake cam 47.

In Fig. 2 the intake valve 7 has just been opened as it appears in Fig. 1 with piston 4 just ready to commence its intake stroke.

Intake valve 7 cooperates with inlet 58, and to the intake inlets 58 of all the cylinders annular tube 59 connects, the tube 59 also has ducts which connect with carbureters suitably mounted on the engine.

Exhaust valve 8 cooperates with outlet 52, and to the exhaust outlet 52 of all the cylinders annular tube 53 connects, and tube 53 also has suitable ducts to vent the exploded gases to atmosphere.

I have not complicated my drawings nor shall I unnecessarily clutter up my description with details about some of the things just as common to conventional engines as to mine, such things being fully understood by any person familiar with the art. I show nothing of a cooling system, nor of those portions of a lubricating system, apart from my tubes 55 and their directly associated parts. The arrangements for water jacketing, etc., may be easily accomplished by ordinary mechanical ingenuity, no invention being involved. A conventional distributor may be employed, connected to gear 54 secured outside my engine to powershaft 1. Conventional carburetor and fuel pump mechanisms may be employed. A conventional starting motor 76 may be secured to end housing 31 with its starting gear adapted to mesh with an annular gear secured to the side of flywheel 2.

I contemplate the middle unit of my engine as an annular casting having all the cylinders accurately bored through it at once by a suitable machine tool. Naturally this casting would be suitably cored for the water jacketing and for the inlet and exhaust passages. Provision would also be made for the passages through which all the push rods 49 are disposed radially to powershaft 1, also for mounting rocker arms 50 suitably.

I contemplate my two end units 28, 28' as annular castings properly machined for receiving guide elements 27.

I contemplate my flywheels 2, 2' as wide annular bands with grooves 13, 13' formed by suitable machine tools cooperating with a special cam which will control and synchronize the lateral feeding movement to form groove 13 in conjunction with the rotary feeding movement necessary to machine groove 13 peripherally about flywheel 2.

Having described the various elements of my engine, it will now be in order to describe in detail what happens during each of the four strokes of piston 4 to accomplish one complete four stroke cycle while powershaft 1 is making two revolutions.

*Intake stroke*

In Fig. 1, the lowermost piston 4 is at its innermost position in cylinder 3, ready to start its intake stroke, and intake valve 7 has just been rapidly and completely opened. Flywheels 2, 2' are revolving with the powershaft in counterclockwise rotation as viewed in Fig. 2. The ball 22 is in that portion of the groove 13 at the extreme left-hand portion of the peripheral face of flywheel 2 as viewed in Fig. 1, and the corresponding ball associated with aligned piston 4' is in that portion of the groove 13' at the extreme right-hand portion of the flywheel 2'. Now as flywheel 2 moves its groove 13 deflects to the right relative to the position of the ball 22 which can reciprocate only on a line parallel with the axis of powershaft 1. So groove 13 will draw ball 22 toward the right along its line of reciprocation, and of course piston 4 will be drawn outwardly relative to the midpoint of the cylinder, and a charge of combustible vapor will be drawn into the cylinder. It must be remembered that the left-hand piston 4' functions simultaneously, oppositely, and in unison.

Groove 13 deflects very sharply to the right (see Fig. 10) from point A to point B which is about 60 degrees of rotation of powershaft 1. Then groove 13 ceases to deflect rapidly and from point B around to point C, which is about 120 degrees from point B, it deflects gradually. At point C of course the full intake stroke will have been completed and piston 4 will have moved to its extreme right hand location in cylinder 3.

Intake valve cam 47 on the periphery of wheel 38 occupies 30 degrees of the arc of flange 46, which means that intake valve 7 will close as soon as flywheel 2 has moved around 60 degrees of the intake stroke, which is from A to B. And the distance to the right which groove 13 has moved during this time is half the total piston movement of 5 inches which ball 22 must make in following groove 13 from A to C, through the entire 240 degree intake stroke. Therefore piston 4, in conjunction with left-hand piston 4', will have drawn into the cylinder at point B, a mass M of combustible gasoline vapor just equal to the mass that a conventional engine having a 3 inch diameter piston and 5 inch stroke would have drawn in during its full intake stroke.

It will now be clear that an arbitrarily limited charge of gasoline vapor has been drawn into cylinder 3 during 60 degrees' rotation of the powershaft, and that intake valve 7 has closed.

Each piston has traveled 2½ inches of its total 5 inch intake stroke, so that the inducted charge is limited to 35 cubic inches volume.

Piston 4 will now continue on to the finish of its stroke, moving another 2½ inches during 180 degrees' further rotation of the powershaft. Obviously, with intake valve 7 closed, such piston movement will at once commence "stretching" the limited inducted charge, in other words, rapidly lower its density. The effect of this upon the charge will be to promote the fragmentation of its vapor globules and their diffusion, to better prepare the charge for subsequent combustion. Now, when piston 4 has moved about 1¼ inches farther than its original 2½ inches of motion the density of the fuel charge will be reduced about 50% lower than when it was received into cylinder 3. At this point ball 22 will be at position E in groove 13 about midway between point B and point C.

At this point I have contrived to provide, under suitable conditions, for the introduction and mixture with my limited charge of gasoline vapor of an auxiliary charge comprising a plurality of other types of vapor.

One of these may preferably be water, and the other a combustible substance. In some instances the latter may preferably be a material cheaper than the gasoline which has been introduced in the first part of the intake stroke but it may include any gaseous or liquefied gas or liquid substance of a combustible character which may be converted into a gas or extremely fine vapor form in the combustion cylinder. Examples of the various types of materials which may be employed as the supplemental fuel include such substances as gasoline, kerosene, diesel fuel, benzol, xylol, toluol, methanol, ethanol, propanol, methane, etc., as well as the various additive agents now being used especially in high octane aviation gasoline to increase the latter's power. It is understood also, of course, that any necessary supplemental air or oxygen will be included with the supplemental fuel to give the required degree of combustion.

For the accomplishment of this I provide my cylinder 3 with a further valve 76 in addition to its conventional intake valve 7 and exhaust valve 8. The valve 76 has a stem 77, a spring 78 and adjusting nut 79 which adjusts the tension of spring 78 to prohibit the opening of valve 76 until a required suction effect is obtained by the process of lowering the density of the original charge provided in cylinder 3. In this way, at approximately the point E, the valve 76 will be drawn open and it will admit into my cylinder 3 under a powerful suction, a limited amount of vapor of supplemental fuel and of water vapor.

Supplemental fuel vapor manifold 80 is an annular tube around my engine and at each cylinder is attached to connecting duct 81. Water vapor manifold 82 is an annular tube around my engine and at each cylinder is attached to connecting duct 83.

In Fig. 14 tube 82 represents the water vapor manifold 82 of Fig. 1. Likewise tube 80 represents the fuel oil vapor manifold 80 of Fig. 1. Likewise tube 130 represents a modification of exhaust manifold 53 of Fig. 1. Likewise tube 59 represents the intake manifold 59 of Fig. 1. A water tank supplies water to the bowl of a carburetor 133 which may be of conventional design excepting for a jacket 134 through which hot exhaust gas from manifold 130 may pass. A further tank containing a supplementary fuel for example, cheap fuel oil, supplies this fuel oil through a tube 136 to the bowl of a carburetor 137 which may be like carburetor 133 having a jacket 138.

Jacket 134 connects by duct 139 with exhaust manifold 130 for receiving hot exhaust gases which pass out through duct 140 and are returned to manifold 130. A scoop 141 pivotally carried by a shaft 142 takes into manifold 130 and is manually adjustable by a lock nut 143 to position the scoop to deflect a desired quantity of hot exhaust gases into duct 139.

Duct 144 is supplied with hot exhaust gases from manifold 130 by a scoop like 141 and after heating bowl 138 of carburetor 137 these gases pass into duct 140 and so back into the exhaust manifold 130. The respective scoops for each carburetor are adjustable and may be set and locked to provide desired amount of heat to carburetors 133 and 137 when engine is hot.

Jacket 145 surrounding hot gases duct 140 has an opening 146 to admit air which is warmed and then goes by duct 147 to carburetor 133 where the water vapor is mixed with it, then it goes through duct 148 into a jacket 149 surrounding exhaust manifold 130. Since this exhaust manifold is red hot when the engine is running under load the vapor contained in the air will be heated to a dry steam degree of fragmentation of the vapor globules. Then it passes through duct 150 into the water vapor manifold 82 for reception into the cylinders through their respective auxiliary valves 76 as previously described regarding Fig. 1. Duct 151 takes air from jacket 145 to carburetor 137 where the fuel oil vapor is mixed with it, then it goes through duct 152 into a jacket 153 surrounding exhaust duct 130 where it is heated, but not heated sufficiently to flash, then it passes through duct 154 to the fuel oil vapor manifold 80 for delivery into the cylinders through their respective auxiliary valves 76 as described.

A pressure relief valve 155 is provided in jacket 149 to insure against dangerous steam pressure developing for any reason.

Tube 156 is connected into the water cooling system of the engine so that when the engine is hot the hot water will circulate through tube 156. A thermostat 157 has an arm 158 which will move counterclockwise when the water in tube 156 is heated. By means of rod 159 a lever 160 will move to open a butterfly valve 161 in tube 148 and so permit the carburetor 133 to supply highly heated water vapor to the engine only when the engine is hot, since lever 158 of thermostat 157 will move clockwise to cause butterfly valve 161 to close when the water in tube 156 is not hot.

The end of rod 159 is threaded to permit considerable adjustment by means of clamp nuts, for its connection to lever 160.

A thermostat 162 likewise cooperates with the temperature of the water in tube 156 to control the supply of fuel oil vapor to the engine, and in the same manner.

The admission of supplemental vaporous substances shall not only be responsive to engine temperature as described, but it should also be responsive to engine speed and load so that at idling speeds or negligible loads none of the supplemental substances should be admitted, and the engine should automatically run on gasoline vapor only.

So Fig. 14 also illustrates how the admission of the supplemental vaporous substances is made responsive to engine speed and load.

A conventional accelerator pedal 163 pushes a rod 164 which controls gasoline carburetor 165 by means of butterfly valve 166 in duct 167 which is connected to the annular intake manifold 59 illustrated in Fig. 1.

A spring 168 influences valve 166 to close to an adjustable idling speed in the conventional manner unless pedal 163 is depressed. When pedal 163 is depressed beyond the position shown in dotted lines the engine would be rotating at relatively rapid speed or under substantial load. When this happens a pin 169 will engage and push forward from abutment 171 a bracket 170 sleeved upon rod 164, against tension of spring 172. Bracket 170 pushes a rod 173 which controls butterfly valve 174 positioned in series with valve 161 in duct 148 which supplies water vapor to the engine. Obviously, opening of valve 161 under the influence of thermostat 157 will not result in supplying water vapor to the cylinders of the engine unless valve 174 controlled by pedal 163 is open; and closure of either valve 161 or valve 174 will cut off that supply.

In like manner bracket 170 pushes a rod which controls a butterfly valve 175 in duct 152 which supplies fuel oil vapor to the engine, so that such supply is controlled by pedal 163, conjointly with thermostat 162. Therefore I have provided that my engine shall not receive supplemental vaporous substances unless the engine is hot, and not even then unless desired conditions of speed and load exist.

Gasoline carburetor 165 receives its air supply by means of duct 176 from jacket 145, from which the water carburetor 133 and the fuel oil carburetor 137 also receive their supply.

In the description and drawings thus far I have illustrated auxiliary inlet valve 76 as adjustably spring actuated to respond to suction of the piston for admitting auxiliary vapor to supplement the gasoline vapor charge. While this may be preferable, particularly in the design of an engine to thoroughly test various applications of the ideas herein expressed, all the valves 76 in the engine could of course be actuated by a single cam upon the periphery of cam wheel 38. As a matter of fact, if a supercharging device is employed the auxiliary valves 76 should be cam operated. And it should be obvious that, while I illustrate and describe a plurality of different supplemental vapors as being handled through the one auxiliary valve 76, there may, if desired, be several such auxiliary valves, one for each supplemental vapor to be introduced.

In the combustion of the gasoline vapor, especially when mixed with supplemental vapors, additional quantities of oxygen would be desirable, this being particularly important if such an engine were used for aircraft, and I have been able to contrive for such supercharging in my engine with essentially no additional parts or moving mechanisms to accomplish it. The key to the idea of how this may be done lies in the previously emphasized statement that my pistons and their piston rods are by the nature of my engine forced to reciprocate on straight lines. This of course is not true of crankshaft type engines.

In Fig. 15 my cylinder 177 is similar to cylinder 3 of Fig. 1 with a few additional features. Piston rod 178 is similar to, and functions the same as, rod 16 in Fig. 1, except that it is of circular cross section. The ends of cylinder 177 are closed by end caps 179, provided with bushed apertures 179' through which the piston rods slide.

A port 180 through a wall of cylinder 177 provides a passage through which piston 181 may pull air from atmosphere into cylinder 177 during the exhaust and compression strokes of piston 181 and a check valve 183 is provided. A further check valve 182 at the lower edge of cap 179 opens to exhaust this air into the engine crankcase during the intake and the power strokes of piston 181. Both these check valves otherwise remain closed by their springs.

In order to lubricate the walls of cylinder 177 notwithstanding its crankcase end being closed by cap 179 I provide an oil tube 184 taking through cap 179 which, while the engine is operating, will direct a very fine stream of oil under high pressure against an upper wall surface of cylinder 177, so that piston 181 may work and spread this oil over the entire surface of the cylinder. The surplus oil thus provided beyond that needed by the frictioning surfaces will constantly accumulate at the lower side of the cylinder adjacent to check valve 182 and so it will constantly be ejected into the crankcase with the air compressed by piston 181 during each intake and power stroke.

The effect of this will be to build up in the crankcase an appreciable air pressure. The crankcase air will, as usual with crankcases, be full of finely fragmented oil particles.

At the end of the engine a large oil trap 185 is provided at its lower edge with an opening 186 to admit this compressed air and to permit trapped oil to drain out of trap 185 and at its upper edge it has an outlet 187 through the end of the engine, connecting with duct 188 which will convey the compressed air to the inlet 146, Fig. 14, of the jacket 145 from which the carburetors 165, 133 and 137 all receive their air supply. These carburetors supply the manifolds 59, 80, and 82 shown in Fig. 1. Thus the compressed air will be received into the cylinder 3 through intake valve 7 during the first half of the intake stroke of piston 4 bearing gasoline vapor, and under proper conditions through an auxiliary valve such as 76 bearing supplemental vaporous substances, it being understood that the auxiliary valve is to be modified to provide for its operation by a single cam or cam wheel 38 as previously described. A valve 189 in duct 187 controlled by lever 190 is conveniently controlled by the engine operator through control rod 191 so as to regulate the degree of supercharging at will, since movement of valve 189 from the position shown will decrease the pressure in tube 188 by venting air to atmosphere.

Air volume pulled from atmosphere through check valve 183 will be the volume provided by the 3″ piston stroking 5 inches, or about 35 cubic inches (less of course the slight displacement of piston rod 178). The air volume supplied to carburetors 165, 133, 137 will of course be about 70 cubic inches since the pistons at the left of cylinder 177 work in unison and do the same as those at the right. But if about 70 cubic inches will be furnished the carburetor during one stroke of piston 181 it follows that about 140 cubic inches will be supplied the carburetors every time the carburetor supplies the 35 cubic inch volume of air required by the two pistons in moving 2½ inches while intake valve 7 is open, as previously described, since 2 strokes of the 4-stroke cycle are delivering compressed air to the engine crankcase. Manifestly therefore, here is a supercharger that will, with almost no added parts or moving mechanism, and at the expense of a slight amount of the engine power, provide for a supercharging of 3 to 4 times the normal amount of oxygen into the cylinder 3 with the gasoline vapor and such supplemental vapors as are admitted during each intake stroke of the piston.

I provide against dangerous pressures in the crankcase by a relief valve 129. The pressure will of course rise while the engine is operating to almost 4 times atmospheric pressure.

By the selectively controllable admission, as I provide, of an additional quantity of supplemental fuel, preferably cheaper than gasoline, and the selectively controllable admission of an additional quantity of oxygen at least partly in the form of water vapor, together with means suitably coordinating all such supplemental admissions with related engine factors such as temperature or speed, I have contrived novel means for desirably varying the kind and quantity and conditions of admission of the supplemental chemical elements that I provide, during my peculiar intake cycle, for subsequent compression and combustion with my initially limited charge of gasoline vapor. For by the application of suitable conventional thermostatic or other controls, the admission of such additional hydrocarbons or other combustible material and water vapor may be at all times and under all conditions automatically controlled to conform to various other factors involved, such as engine temperature and engine speed.

If desired, the moving parts of my cylinder and piston which come in contact with the hot products of combustion may be constructed of stainless steel or chromium plated or otherwise constructed to reduce or obviate corrosion.

If desired, also, I may construct the piston head or other parts of the cylinder of catalytic metals which facilitate the reaction of the water vapor with the hydrocarbons to give combustible mixtures of improved properties.

Compression stroke

When final point C of the intake stroke is reached, groove 13 changes direction and draws piston 4 to the left to start the compression stroke, which will continue from point C to point A, a total of 120 degrees. Note however that in the first one-third of the compression stroke, or 40 degrees from point C to point D, groove 13 deflects so sharply to the left that at point D it has caused piston 4 to move through half its compression stroke. Since the portion of groove 13 extending from point D to point A occupies 80 degrees of rotation with only half the compression stroke to be completed, the speed of the stroke will be retarded as compression builds up, which will minimize compression "bump."

Power stroke

Compression having been completed and the groove 13 having shifted piston 4 to the extreme left-hand position of its movement, the engine has arrived at what we would term "top dead center" in a conventional crankshaft engine and the power stroke will begin.

At or somewhat ahead of this point spark plug 9 will ignite the compressed charge.

My compressed charge will, by reason of the higher degree of vaporization accomplished by previously "stretching" it to a higher degree of vacuum, ignite throughout its mass at a rapid rate, and by reason of the additional quantity of hydrocarbons and water vapor as provided for, the chemical reaction known as explosion will afford a more powerful energy to push my pistons quickly and violently apart.

This is not desirable in a conventional motor, witness the use of a lead compound ethyl to purposely retard the rate of complete combustion of the charge for the purpose of preventing knock immediately upon ignition. Of course there would be an objectionable knock in my engine, as I deliberately increase the rate of ignition and combustion of the charge, if my combustion chamber had a fixed combustion head at one side and a piston at the other side resisting acceleration to the desired velocity of motion. It is evident that such an arrangement admits of no way to permit the violent force of rapid combustion to do anything else than to knock. The piston can only commence its motion very deliberately, as the crank starts to move laterally upon the arc upon which it must move. The slow moving single piston can only very gradually gain rapidity of motion sufficient to permit of any appreciable expansion of the ignited charge.

On the other hand, in my engine two pistons commence rapidly to move apart immediately upon ignition and whatever rapidity of piston motion is thereupon attained has, by reason of the two pistons, the effect of doubling the rapidity and volume of expansion permitted the ignited charge. And, besides this I shall show that my piston speed acceleration itself is much faster than is possible with conventional construction. As a matter of fact, under the force of rapid and complete ignition of the charge my pistons immediately lunge quickly apart.

In Fig. 1 it will be seen that groove 13 starts at once to deflect to the right. This means that as the driving force of the piston acts through the contact of ball 22 with groove 13, a rotative force will be transmitted to flywheel 2 of powershaft 1, forcing the flywheel to turn counter-clockwise as viewed in Fig. 2.

It may be noted here that the force applied to my powershaft for producing rotative energy is applied directly to the flywheel and through it to the powershaft; not to a crankshaft and through it to a flywheel.

Now, from point A, the beginning of the power stroke, to point B is 60 degrees of rotation of powershaft 1, or only one-fourth of the 240 degrees from A to C which I provide for my total power stroke. But groove 13 inclines so rapidly to the right from A to B that piston 4 will move half the 5 inches of its entire power stroke while travelling through the 60 degree portion of the groove 13. In other words, considering both pistons 4 and 4' it will be apparent that within 60 degrees or ⅙ rotation of my powershaft I have arranged for an expansion in volume of my ignited charge exactly equal to the total expansion that a conventional engine with a 3 inch piston and 5 inch stroke could permit in its full stroke consuming a time element of 180 degrees' rotation of the powershaft. The rapidity of expansion of the gases is therefore tripled, relative of course to degrees of rotation of the engine powershaft. In this way, as described by the foregoing, I overcome the knock attendant upon rapid complete ignition. I want the thing that expensive lead compounds must be fed to a conventional engine to prevent. I want my two pistons to lunge quickly and violently apart, because I want this live full bundle of energy applied through ball 22 to flywheel 2 to produce powerful rotative energy of my powershaft 1.

Other factors now enter the picture. Once combustion begins, a time factor is involved in its full completion and a volume of expansion factor is likewise involved.

So, in recognition of these factors, I have contrived my groove 13 to flatten out at B so as to distinctly decelerate the speed of piston 4 during its stroke, whereby from B to C through a full half turn of my powershaft a proportionately very large time factor is provided to fully complete the combustion of the charge.

As to the expansion factor, I have first above explained in detailed description of the intake stroke how the mass of gasoline vapor charge initially taken into cylinder 3 is the same as that taken into the cylinder of a conventional engine having 3 inch pistons and 5 inch stroke, and that that fuel mass has expanded, at point B of the power stroke, to the full 35 cubic inch volume to which it could expand in the full 180 degree power stroke of a conventional engine, so that it will now be apparent how, by continuing the motion of my pistons 4, 4' from point B to point C the expansion of my ignited gases may continue until they reach double their volume at point B, which is, of course, 70 cubic inches and double the expansion the same size gasoline vapor charge could attain in a conventional engine, and during all this time piston 4 is applying powerful energy through ball 22 to rotate flywheel 2. The latter part of the foregoing sentence is strictly applicable under conditions, such as with a cold engine, where I do not choose to permit the valve 76 to introduce supplemental substances after closing valve 7. It should be obvious that a total inducted volume comprising the sum of an initial gasoline vapor charge plus a supplemental charge would not double.

It should now be noted how peculiarly interrelated are my intake and my power strokes. In the first place I gave my groove 13 certain particular characteristics in order to obtain the kind of intake stroke I wanted. Then I discovered that these particular characteristics were by chance exactly the characteristics the groove must have to effect the kind of power stroke I wanted. Luckily, the intake and power strokes alternate with compression and exhaust strokes in the 4 stroke cycle. And furthermore the results I obtain with my peculiar intake stroke combine perfectly with the results I can obtain with my particular power stroke in order to attain a prime objective of this invention—an enlargement of that fraction of the potential power of a unit of liquid fuel which can be effectively transformed into actual kinetic energy in an internal combustion engine.

*Exhaust stroke*

Upon completion of the power stroke at C the exhaust valve 8 will have just completely opened, and from point C groove 13 changes its direction to cause piston 4 to move to the left and start the exhaust stroke, which will continue from C to A, a total of 120 degrees. So that on wheel 38 at the left side of flange 46 the exhaust cam will occupy a peripheral distance of 60 degrees, since wheel 38 rotates about the axis of the powershaft 1 at half the powershaft speed.

As previously explained, the distance from C to A around groove 13 has already functioned to produce the compression stroke so that its characteristics have been defined. It deflects so sharply in the first 40 degrees that, from point C to point D it causes piston 4 to move through half its full compression stroke and I have discovered that the characteristics of groove 13 for the compression stroke are also those I want it to have for the exhaust stroke.

The hot gases should be scavenged from the cylinder as quickly as possible after completion of the power stroke. So it will be seen that in only 40 degrees' rotation of the powershaft, half the gases are ejected, and the remainder will be under almost a vacuum pull to follow those ejected so quickly. As groove 13 approaches point A the piston speed has slowed down substantially so that intake valve 7 may start opening ahead of point A so as to be completely open when point A is reached by ball 22.

Although I have directed the description of my improved engine to a power unit employing gasoline for fuel, it should be understood that improvements which have been described may be applied also to a power unit employing diesel fuel. A number of my improvements would be particularly valuable in a diesel engine, particularly my means for changing the pace of a piston during its stroke, my means permitting employment of more or less than 180 degrees of powershaft rotation for a stroke, and my means for introducing initial and supplementary fuel charges as described.

In the foregoing description of my improved engine it may be noted that particular emphasis has been given to the objective of obtaining from a given unit of fuel a greater proportional amount of its potential power than conventional engines having a single piston in a cylinder are able to obtain.

If, however, the paramount consideration should be to provide an engine developing maximum power in proportion to its size and weight, as may be desirable in aircraft engines, the useful factors that I have devised means to desirably incorporate in the engine described heretofore may also readily be desirably incorporated in an engine of great power relative to its size and weight. A description follows.

In Fig. 11 it should be evident that flywheel 102 is a counterpart of flywheel 2 of Fig. 1, and flywheel 102' a counterpart of flywheel 2'. They have merely been moved closer together and their positions reversed, while their axial dimensions have been increased. Cylinder 103 is like cylinder 3 except that it now is a conventional type of cylinder having a single piston 104 and a fixed combustion head and that it is so dimensioned as to provide substantially a 10-inch stroke. The operation of valves, etc., is just the same. The guide 127 is like guide 27 except that it is longer and located centrally of the two cylinders. Single pistons in independent single cylinders now move simultaneously toward each other on their power strokes instead of having tandem pistons in one cylinder moving away from each other on that stroke. The valve cam wheel 38 central of the engine in Fig. 1 now becomes two such valve cam wheels at opposite ends of the engine, since valves in the right hand ring of cylinders and in the left-hand ring of cylinders must be operated.

It is to be understood that opposite cylinders in Fig. 11 will fire simultaneously and that the timing of the cylinder explosion sequence will be exactly as in Fig. 1 with each cylinder in the ring of cylinders about the powershaft firing in turn.

The operation of the modified engine in Fig. 11 is closely similar to that of Fig. 1 and many of the actual parts of the engine are identical. Having described the engine of Fig. 1 in detail it should be clearly evident to any person skilled in the art exactly how the modified engine of Fig. 11 will operate, without it being necessary or desirable to give a long detailed description.

Figure 9:
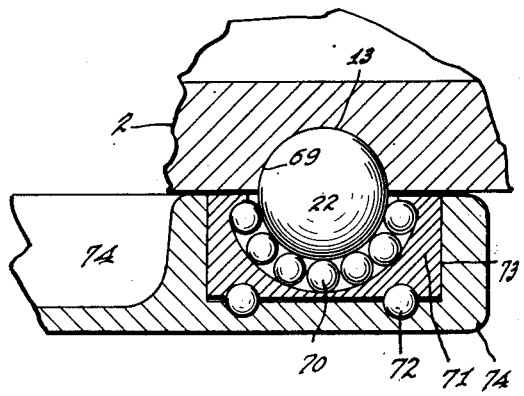
Fig. 9 illustrates a modified form of support for the power-transmitting ball.

In Fig. 9 is shown a more desirable organization than the simple arrangement shown in Fig. 1 for embracing my propelling ball 22. In Fig. 9 semi-cylindrical groove 13 in the face of flywheel 2 is at all times exactly engaged at all points across the groove by a line contact 69 around one hemisphere of ball 22. The other half of ball 22 is full floating in a nest filled with balls 70 lining the cup 71. Cup 71 is also provided with a thrust bearing 72. The full hemispherical surface contact of ball 22 with cup 20 of Fig. 1 has now become a hemispherical contact by a plurality of spots on ball 22 against balls 70 and a hemispherical contact at a plurality of spots by balls 70 against cup 71. Obviously such an organization will more effectively insure the free full floating character of ball 22 relative to cup 71 and reduce friction and a profuse supply of lubricant will be always present in the interstices between balls 70. Obviously also thrust bearing 72 will be better adapted to take the severe lateral thrust of ball 22 while propelling flywheel 2 than the plain surface contact shown in Fig. 1. In Fig. 9 cup 71 no longer has a shank, being bodily received in a socket 73 formed in piston connecting rod 74 and this construction permits bringing the line of reciprocation of rod 74 closer to groove 13 of flywheel 2. Rod 74 is, of course, guided just as is rod 16 in Fig. 1.

It should readily be perceived that the tandem flywheels 2, 2' of Fig. 1 are an absolute requirement for that engine owing to its tandem piston construction. The engine of Fig. 11 would not require tandem flywheels for this reason. The reason the engine of Fig. 11 does have tandem flywheels is so that it may incorporate the ideas of 240 and 120 degree piston strokes and of changing the piston pace during its various strokes. If the service for which the engine of Fig. 11 was intended did not indicate these ideas to be highly important, that engine may be readily modified so as to have only one centrally positioned flywheel bearing a single cam track upon its periphery, to which all the pistons in the engine would connect. A preferable way to accomplish this would be to employ the raised cam track illustrated in Figs. 12 and 13.

Then each piston to the right side of the engine would be directly connected to its opposite piston to the left side of the engine by means of a single connecting rod, and this connecting rod would carry at its midpoint the swivel bar—illustrated in Fig. 13—which would carry the pair of rollers engaging opposite sides of the rectangular cam track exactly as described. Obviously in this construction an intake or power stroke of a piston at the left side of the engine would be simultaneous with a compression or exhaust stroke of the opposite piston at the right side of the engine, and each stroke of the four stroke cycle of all the pistons in the engine would be 180 degrees.

If the prime consideration in the design of an engine employing the ideas herein described should be to produce, for aircraft use, an engine of the maximum power in relation to its weight, its size, and particularly its frontal area as regards head resistance to flight through the air, it should be obvious that two or even three engines such as those of Fig. 1 or of Fig. 11 could be designed as a single engine having a common crankcase and a single power shaft running the full length of the engine, with all the cylinders in the engine connected to this single powershaft. If the engine of Fig. 11 is substantially 24 inches in diameter and 36 inch length then an engine designed to have the combined power of three such units would be of cylindrical shape, about nine feet in length but still of only two feet diameter. Therefore the head resistance to flight, for such an engine of several thousand horsepower, would not increase as its horsepower increases as do present engines of either the radial or the liquid cooled types. Such engines could conceivably be housed completely within the wing of an airplane so as to add no head resistance to the passage of the airplane through the air, beyond the resistance of the wing itself, and this cannot be done with any presently used aircraft engine. Such an engine could also utilize the novel idea of supercharging as heretofore described, which would greatly increase its desirability for aircraft service. Such an engine would also give a tremendous horsepower in proportion to its weight, far greater than has been even approached by presently used engines.

Having completed a description of my engine and its four stroke cycle, it should be apparent that I have devised means to desirably bring into effect every one of the nineteen factors previously enumerated as being factors that could have a very desirable and useful influence upon the performance of an internal combustion engine. Many of these factors could not be desirably brought into play in a conventional engine such as we have in our automobiles. By bringing into useful play nineteen additional beneficially influential factors besides the five conventional dominating factors mentioned as governing the operation of an internal combustion engine, I believe that I have invented new and useful improvements.

I claim as my invention:

1. In an internal combustion engine a powershaft, a plurality of cylinders arranged in an annular series about the axis of said powershaft, piston means for each cylinder reciprocable upon a line parallel to the axis of said powershaft, a ball for each piston means operatively connected to its piston means and engaging a continuous groove disposed upon the peripheral face of a flywheel keyed to said powershaft and further disposed in various planes laterally of said peripheral face, said groove being formed to provide an intake and power reach comprising a peripherally minor section inclining sharply in a direction parallel with the axis of said powershaft and a peripherally major section inclining less sharply in said direction, and being further formed with an exhaust and compression reach merging with said first-named reach and comprising a peripherally minor section inclining sharply in the opposite direction and a peripherally major section inclining less sharply in said last-mentioned direction, whereby the pace of each piston is changed during each stroke thereof.

2. In an engine, a piston, a powershaft and a connecting rod having an opening therethrough with its axis perpendicular to the line of piston reciprocation, a ball snugly fitting in said opening and projecting oppositely through the opposite ends thereof, an element moving with said shaft and having a peripheral cam groove therein, and a member providing a rectilinear groove in line with piston movement, the oppositely projecting portions of said ball being respectively operatively received in said grooves.

3. In an engine a piston, a powershaft, a piston rod connected to move with said piston, and means for guiding reciprocation of said piston rod including means formed to provide a groove of substantially semicircular cross section and extending parallel with the line of movement of said piston, a ball, and means constraining said ball to move with said piston rod, said ball being guidingly received in said groove, said piston rod having a motion-converting connection with said powershaft.

4. In an engine, a powershaft, cam means mounted to rotate with said powershaft and formed to provide a continuous annular trackway, said trackway having portions inclining axially of said cam means, a cylinder, a piston mounted in said cylinder for reciprocation upon a line parallel with the axis of said powershaft, and means providing an operative connection between said piston and said trackway, said trackway including a first portion inclining rapidly toward one axial end of said cam means, a second portion merging with said first portion and inclining less rapidly toward said one end of said cam means, a third portion merging with said second portion and inclining rapidly toward the other end of said cam means, and a fourth portion merging with said third and first portions and inclining less rapidly toward said other end of said cam means.

5. In an internal combustion engine, a cylinder, a piston mounted for reciprocation in said cylinder, a powershaft mounted for rotation upon an axis parallel with the axis of said cylinder, an element mounted for rotation with said powershaft and formed to provide a continuous, sinuous cam track coaxial with said powershaft, said cam track consisting of a first portion having a peripheral extent of approximately 60° and an axial displacement proportional to approximately one-half the stroke of said piston, a second portion merging with said first portion and having a peripheral extent of approximately 180° and an axial displacement in the same direction proportional to approximately one-half the stroke of said piston, a third portion merging with said second portion and having a peripheral extent of approximately 40° and an axial displacement in the opposite direction proportional to approximately one-half the stroke of said piston, and a fourth portion merging with said third and first portions and having a peripheral extent of approximately 80° and an axial displacement in said opposite direction proportional to approximately one-half the stroke of said piston, and means providing an operative connection between said piston and said cam track to convert piston reciprocation into powershaft rotation.

6. In an internal combustion engine, a cylinder, a piston mounted for reciprocation in said cylinder, a powershaft mounted for rotation upon an axis parallel with the axis of said cylinder, an element mounted for rotation with said powershaft and formed to provide a continuous, sinuous cam track coaxial with said powershaft, said cam track consisting of a first portion and a second portion merging with said first portion, said first and second portions each having an axial displacement in one direction approximately proportional to one-half the stroke of said piston but said first portion having a peripheral extent substantially less than that of said second portion, a third portion merging with said second portion and a fourth portion merging with said third and first portions, said third and fourth portions each having an axial displacement in the opposite direction approximately proportional to one-half the stroke of said piston but said third portion having a peripheral extent substantially less than that of said fourth portion, and means providing an operative connection between said piston and said cam track to convert piston reciprocation into powershaft rotation.

7. In an internal combustion engine, a cylinder, a piston mounted for reciprocation in said cylinder, a powershaft mounted for rotation upon an axis parallel with the axis of said cylinder, an element mounted for rotation with said powershaft and formed to provide a continuous, sinuous cam track coaxial with said powershaft, said cam track consisting of a first portion and a second portion merging with said first portion, said first and second portions having a combined axial displacement proportional to the stroke of said piston but said first portion having a ratio of axial displacement to peripheral extent greater than that of said second portion, a third portion merging with said second portion and a fourth portion merging with said first and third portions, said third and fourth portions having a combined axial displacement proportional to the stroke of said piston but said third portion having a ratio of axial displacement to peripheral extent greater than that of said fourth portion, and means providing an operative connection between said piston and said cam track to convert piston reciprocation into powershaft rotation.

FRANK L. FULKE.

References Cited in the file of this patent

UNITED STATES PATENTS

| Number | Name | Date |
|---|---|---|
| 792,615 | Ramsey | June 20, 1905 |
| 1,239,310 | Shepard | Sept. 4, 1917 |
| 1,324,520 | Robbins | Dec. 9, 1919 |
| 1,355,484 | Lleo et al. | Oct. 12, 1920 |
| 1,445,686 | Hult | Feb. 20, 1923 |
| 1,483,619 | Smith | Feb. 12, 1924 |
| 1,539,752 | McCain et al. | May 26, 1925 |
| 1,565,184 | Miller | Dec. 8, 1925 |
| 1,629,327 | Waldo | May 17, 1927 |
| 1,781,008 | Greening et al. | Nov. 11, 1930 |
| 1,796,453 | Goehler | Mar. 17, 1931 |
| 1,798,866 | Bleser | Mar. 31, 1931 |
| 1,810,017 | Houston | June 16, 1931 |
| 1,819,137 | Thompson | Aug. 18, 1931 |
| 1,890,814 | Hubbs | Dec. 13, 1932 |
| 1,895,206 | Ricardo | Jan. 24, 1933 |
| 1,918,840 | Eriksen | July 18, 1933 |
| 1,978,194 | Gray | Oct. 23, 1934 |
| 2,001,533 | Houston | May 14, 1935 |
| 2,083,510 | Stigers | June 8, 1937 |
| 2,243,817 | Hermann | May 27, 1941 |
| 2,243,822 | Hermann | May 27, 1941 |
| 2,246,733 | Kiefer | June 24, 1941 |
| 2,353,313 | Lane | July 11, 1944 |
| 2,366,595 | Christopher | Jan. 2, 1945 |

FOREIGN PATENTS

| Number | Country | Date |
|---|---|---|
| 554,325 | France | June 8, 1923 |
| 646,739 | France | July 17, 1928 |
| 730,546 | France | Aug. 17, 1932 |
| 782,997 | France | July 5, 1935 |